United States Patent
Hu et al.

(10) Patent No.: US 9,694,796 B2
(45) Date of Patent: Jul. 4, 2017

(54) ADAPTIVE HILL-HOLD CONTROL

(71) Applicant: Robert Bosch GmbH, Stuttgart (DE)

(72) Inventors: Jiamu Hu, Rochester Hills, MI (US); James Timpa, Howell, MI (US); Joseph J. Anderson, Northville, MI (US); Dushyant Wadivkar, Farmington Hills, MI (US); Arthur Stephenson, Southfield, MI (US); Nick LaPlaca, Royal Oak, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/787,298

(22) PCT Filed: Apr. 29, 2014

(86) PCT No.: PCT/US2014/035819

§ 371 (c)(1),
(2) Date: Oct. 27, 2015

(87) PCT Pub. No.: WO2014/179281

PCT Pub. Date: Nov. 6, 2014

(65) Prior Publication Data

US 2016/0101766 A1    Apr. 14, 2016

Related U.S. Application Data

(60) Provisional application No. 61/817,097, filed on Apr. 29, 2013.

(51) Int. Cl.
*B60T 7/12* (2006.01)
*B60T 8/24* (2006.01)
*B60T 7/20* (2006.01)

(52) U.S. Cl.
CPC ............ *B60T 8/24* (2013.01); *B60T 7/122* (2013.01); *B60T 7/20* (2013.01); *B60T 8/245* (2013.01); *B60T 2201/06* (2013.01)

(58) Field of Classification Search
CPC combination set(s) only.
See application file for complete search history.

(56) References Cited

U.S. PATENT DOCUMENTS 3,802,749 A    4/1974    Carp et al.
5,390,992 A    2/1995    Walenty et al.
(Continued)

FOREIGN PATENT DOCUMENTS

DE    102010031673 A1    1/2012
EP    0566344 A1    10/1993
(Continued)

OTHER PUBLICATIONS

International Search Report and Written Opinion for Application No. PCT/US2014/035819 dated Nov. 4, 2014, 10 pages.

*Primary Examiner* — Edward J Pipala
(74) *Attorney, Agent, or Firm* — Michael Best & Friedrich LLP

(57) ABSTRACT

A hill-hold control system for a vehicle. The hill-hold control system includes a first wheel brake (120A, 120B), a second wheel brake (120C, 120D), a braking indicator (brake pedal), a drive away indicator (accelerator), and a controller (130). The controller is configured to determine that the vehicle is at standstill, detect from the braking indicator that braking is no longer desired, adjust a braking pressure at the first wheel brake, adjust a braking pressure at the second wheel brake, detect from the drive away indicator an operator's desire to drive away, and when the operator's desire to drive away is detected, removing the braking pressure at the first wheel brake and the braking pressure at the second wheel brake.

20 Claims, 3 Drawing Sheets

(56) References Cited

U.S. PATENT DOCUMENTS

| | | | |
|---|---|---|---|
| 5,820,515 A | 10/1998 | Fukaya et al. | |
| 7,681,961 B2 | 3/2010 | Nonaga et al. | |
| 8,027,774 B2 | 9/2011 | Laiou et al. | |
| 8,412,436 B2* | 4/2013 | Mallet | B60T 7/122 303/112 |
| 2003/0141759 A1 | 7/2003 | Erban et al. | |
| 2014/0249729 A1* | 9/2014 | Schwartz | B60T 7/122 701/70 |

FOREIGN PATENT DOCUMENTS

| | | |
|---|---|---|
| EP | 1293406 A2 | 3/2003 |
| EP | 102005021492 A1 | 11/2006 |
| JP | 1994305410 A | 6/1996 |
| WO | 2011147859 A1 | 12/2011 |

\* cited by examiner

ADAPTIVE HILL-HOLD CONTROL

RELATED APPLICATION

The present patent application claims the benefit of prior filed co-pending U.S. Provisional Patent Application No. 61/817,097, filed on Apr. 29, 2013, the entire content of which is hereby incorporated by reference.

BACKGROUND

The present invention relates to a hill-hold control (HHC) system, specifically to a hill-hold control system that dynamically adjusts braking pressure to the wheels of a vehicle (and a trailer if the vehicle is towing the trailer) to limit the amount of pressure to what is needed to hold the vehicle in place.

Current HHC functions hold pressure uniformly for all four wheels equally, including trailer brakes if a trailer is connected. The pressure is applied at the level requested by a driver through a brake pedal. There are two shortcomings of this control strategy. First, the strategy does not consider that a driver often over-brakes a vehicle, so more pressure is applied than required. Holding more pressure requires more current to control a switchover valve (USV) coil, thus increasing the durability required for the valve, and introducing noise-vibration-heat (NVH) issues due to valve activation.

Second, the strategy holds pressure in all hydraulic circuits equally, where a hydraulic unit can have different USV valves in different hydraulic circuits (e.g., front wheels versus rear wheels), and the filet it may be optimal to control different wheels using different pressure levels.

SUMMARY

The invention provides a system for adaptive hill-hold control for a vehicle. The system includes a first wheel, a first wheel brake, a second wheel, a second wheel brake, a braking, indicator (e.g., a brake pedal), a drive away indicator (e.g., an accelerator), and a controller. The controller is configured to determine when the vehicle is at standstill and the braking indicator indicates that a driver is no longer braking, the controller reducing a pressure on the first wheel brake and a pressure on the second wheel brake to a level that continues to hold the vehicle in place but is less than the pressure the level maintained by a driver. The level at the first wheel brake being different than the level at the second wheel brake.

A method of hill-hold control includes determining that HHC is to be engaged, determining a plurality of parameters about the vehicle and its environment, adjusting a pressure at a first wheel brake based on the parameters, and adjusting a pressure at a second wheel brake based on the parameters. The adjusted pressure at the first wheel brake being different from the pressure at the second wheel brake.

In one embodiment the invention provides a hill-hold control system for a vehicle. The hill-hold control system includes a first wheel brake, a second wheel brake, a braking indicator, a drive away indicator, and a controller. The controller is configured to determine the vehicle is at standstill, detect from the braking indicator that braking is no longer desired, adjust a braking pressure at the first wheel brake, adjust a braking pressure at the second wheel brake, detect from the drive away indicator an operator's desire to drive away, and when the operator's desire to drive away is detected, removing the braking pressure at the first wheel brake and the braking pressure at the second wheel brake.

In another embodiment the invention provides a method of performing hill-hold control for a vehicle. The method includes determining, by a controller, that the vehicle is at standstill, detecting, by the controller, from a braking indicator that braking is no longer desired, adjusting, by the controller, a braking pressure at a first wheel brake, adjusting, by the controller, a braking pressure at a second wheel brake, detecting, by the controller, from a drive away indicator an operator's desire to drive away, and when the operator's desire to drive away is detected, removing, by the controller, the braking pressure at the first wheel brake and the braking pressure at the second wheel brake.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following, description or illustrated in the following drawings. The invention is capable of other embodiments and of being practiced or of being carried out in various ways.

Figure 1:
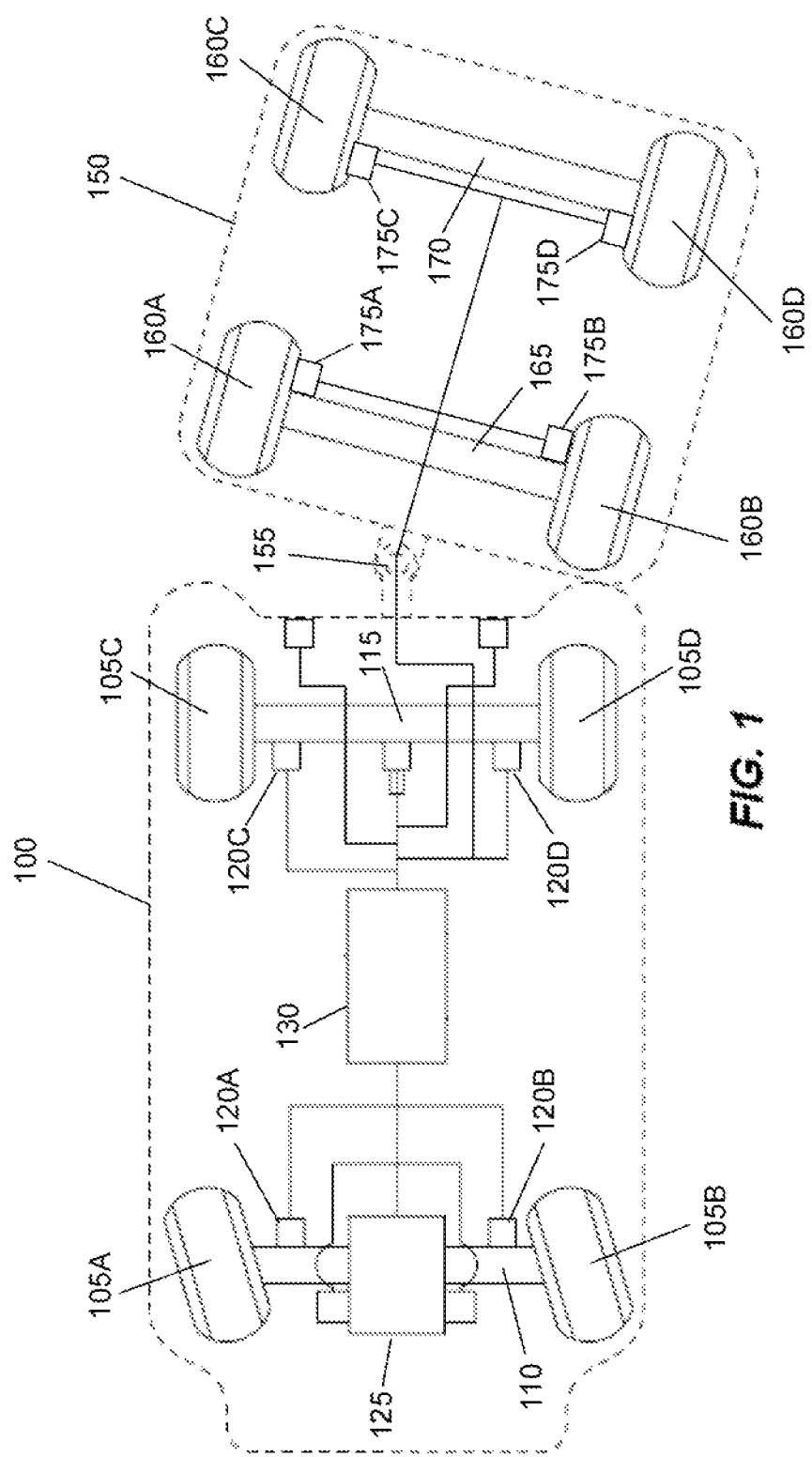
FIG. 1 is a block diagram of a vehicle and optional trailer.

FIG. 1 illustrates a vehicle 100 that has four wheels 105A, 105B, 105C, and 105D. The front wheels 105A and 105B are coupled to a front axle 110, and the rear wheels 105C and 105D are coupled to a rear axle 115. Each of the wheels 105A-105D have associated brakes 120A-120D. The vehicle 100 includes an engine 125 and an electronic control unit ("ECU") 130. An operator (i.e., a driver) of the vehicle 100 operates a throttle (i.e., an accelerator) and brake, and turns a steeling wheel to direct the vehicle in a desired direction.

An optional trailer 150 is coupled to the rear end of the vehicle by a hitch 155. The trailer 150 includes four wheels 160A, 160B, 160C, and 160D. The front wheels 160A and 160B are coupled to a front axle 165, and the rear wheels 160C and 160D are coupled to a rear axle 170. The trailer 150 can have different numbers of axles (e.g., one) (and, therefore, a different number of wheels), and can be a semi-trailer, a full-size trailer, a boat trailer, a camper, or the like. The trailer 150 also includes brakes 175A-175D at each of the wheels 160A-160D. The brakes can be electric or hydraulic and are controlled by the ECU 125 via electric signals (e.g., to the brake valves individually or to electric motors or actuators).

The controller 130 includes a processor (e.g., a microprocessor, microcontroller, ASIC, DSP, etc.) and memory (e.g., flash, ROM, RAM, EEPROM, etc), which can be internal to the processor, external to the processor, or a combination thereof. The controller 130 also includes other circuits such as input/output circuits and communication circuits.

Figure 2:
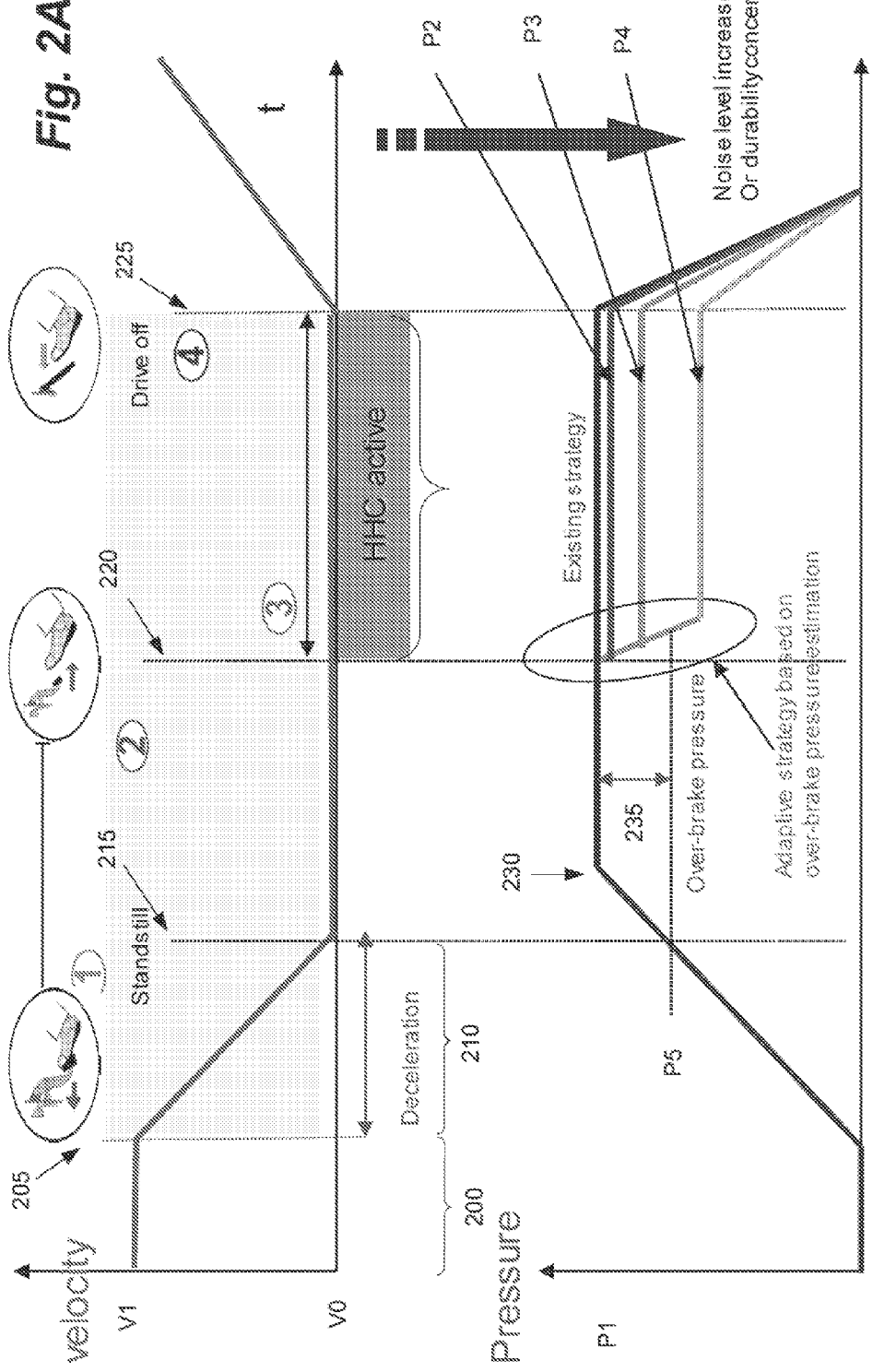
FIGS. 2A and 2B are a set of graphs depicting the operation of the adaptive hill-hold control.

FIG. 2A is graph of the velocity of a vehicle before, during, and after a stopping, procedure. During period 200, the vehicle is moving at a velocity V1. At time 205, the driver steps on the brake pedal to initiate stopping of the vehicle. During period 210, the vehicle slows to a stop (velocity V0, time 215). At time 220, the driver releases the brake pedal and HHC becomes active to hold the vehicle in place until time 225 when the driver steps on the accelerator and the vehicle accelerates (i.e., drive off).

FIG. 2B is a graph of the brake pressure applied to the wheels of the vehicle (and trailer if attached) corresponding to the actions in FIG. 2A. At time 205, when the driver steps on the brake pedal, the pressure at the brakes ramps up. Once the vehicle comes to a stop, time 215, the pressure generally continues to increase because the driver has pressed down more than necessary on the brake pedal. Once the pressure reaches the level indicated by the depression of the brake pedal (pressure P1, time 230), the pressure levels off and remains relatively constant. The over-brake pressure 235 is not necessary to hold the vehicle in place and can cause NVH issues as well as requiring more robust parts to handle the excess pressure in the brake system. In prior art brake systems, a HHC holds the brake pressure steady (at pressure P1) until drive off. However, the invention adjusts the pressure at each of the wheel brakes to continue to hold the vehicle in place but to reduce the amount of excess pressure in the system. Based on the vehicle weight, the existence or absence of a trailer, and a gradient of the road the vehicle is on, the controller determines an appropriate pressure for each of the brakes. As indicated in FIG. 2B, the trailer brakes may be maintained at pressure P2, the front wheel brakes at pressure P3, and the rear wheel brakes at pressure P4. The relative differences between the pressures P1-P4 will vary based on the vehicle/trailer weight and the gradient of the road. For example, on a flat road, the pressures P2-P4 will all be closer to a standstill pressure P5, and the relative differences between pressures P2-P4 will be small. On a steep incline, the pressures P2-P4 will vary by greater amounts and one or more of the pressures P2-P4 will be greater relative to the standstill pressure P5 than they are on a flat road. In addition, if the vehicle is pointing up an incline, the rear brake pressure P4 may be greater than the front brake pressure P3. At time 225, drive off, the brake pressure is released.

The controller 130 uses stored values (e.g., combined gross vehicle weight) and calculated values (e.g., gradient) to determine the brake pressures P2-P4. The controller 130 also uses inputs from various sensors (e.g., wheel speed sensors, lateral acceleration sensors) to perform its calculations.

Figure 3:
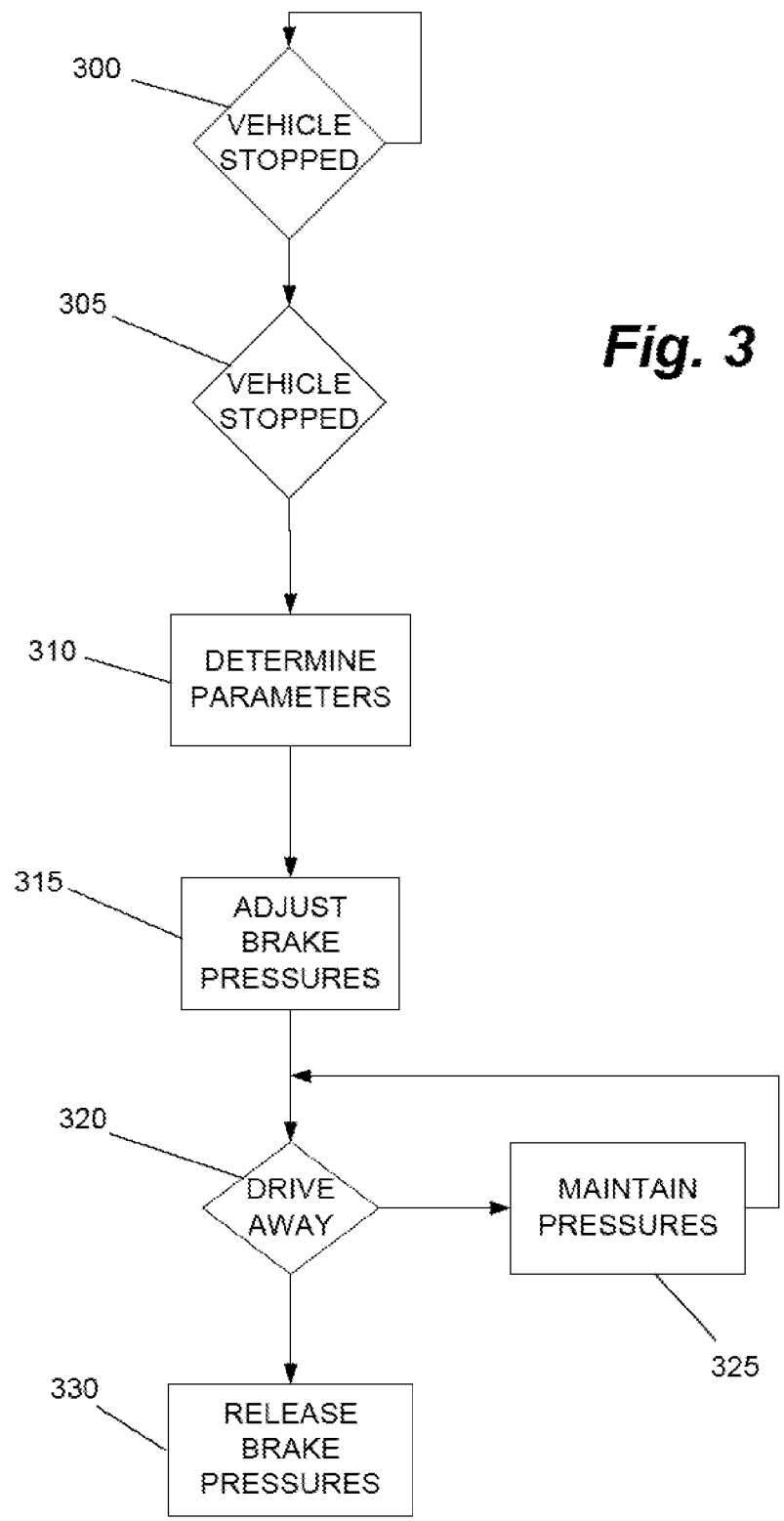
FIG. 3 is a flow chart of the operation shown in FIGS. 2A dn 211.

FIG. 3 is a flow chart of the operation of the adaptive HHC system. The controller checks if the vehicle is stopped (i.e., at standstill) (step 300). If not, the HHC is not engaged. If the vehicle is stopped, the controller determines if the brake pedal has been released by the driver (step 305). If the brake pedal is not released, the controller continues checking the brake pedal. If the brake pedal is released, the HHC is engaged and the controller determines what pressures should be maintained at each of the wheel brakes (step 310). As discussed. above, the pressure at the brakes is generally more than is necessary to maintain the vehicle in a standstill (i.e., due to excessive pressure put on the brake pedal by the driver). The controller determines an appropriate pressure for each of the brakes based on the vehicle weight, the existence or absence of a trailer, and a gradient of the road the vehicle is on. Next the controller adjusts each of the brake pressures to the optimum level determined (step 315). The controller then checks if the driver intends to drive the vehicle away (e.g., by detecting the driver stepping on the accelerator) (step 320). If the vehicle is not being driven away, the controller maintains the pressures at the brakes (step 325) and continues to check for drive away (step 320). If the controller determines that the vehicle is being driven away, the controller releases the pressure at all of the brakes (step 330). In some embodiments, the controller releases the pressure at the brakes at different rates from one another or releases the pressure at one or more brakes prior to releasing pressure at another brake.

What is claimed is:

1. A hill-hold control system for a vehicle, the system comprising:
   a first wheel brake;
   a second wheel brake;
   a braking indicator;
   a drive away indicator; and
   a controller, the controller configured to
      determine the vehicle is at standstill,
      detect from the braking indicator that braking is no longer desired,
      adjust a braking pressure at the first wheel brake when braking is no longer desired to a pressure less than a braking pressure applied by an operator of the vehicle,
      adjust a braking pressure at the second wheel brake when braking is no longer desired to a pressure less than the adjusted braking pressure applied at the first wheel brake,
      detect from the drive away indicator an operator's desire to drive away, and
      when the operator's desire to drive away is detected, removing the braking pressure at the first wheel brake and the braking pressure at the second wheel brake.

2. The hill-hold control system of claim 1, wherein the braking indicator is a brake pedal of the vehicle.

3. The hill-hold control system of claim 1, wherein the drive away indicator is an accelerator of the vehicle.

4. The hill-hold control system of claim 1, wherein the controller determines an amount of brake pressure necessary to hold the vehicle still.

5. The hill-hold control system of claim 4, wherein the controller adjusts the brake pressure at the first wheel brake and the brake pressure at the second wheel brake based on the brake pressure necessary to hold the vehicle still.

6. The hill-hold control system of claim 5, wherein the controller adjusts the brake pressure at the first wheel brake to a pressure greater than the brake pressure necessary to hold the vehicle still and the brake pressure at the second wheel brake to a pressure less than the brake pressure necessary to hold the vehicle still.

7. The hill-hold control system of claim 6, wherein the first wheel brake is for a front wheel of the vehicle and the second wheel brake is for a rear wheel of the vehicle.

8. The hill-hold control system of claim 1, wherein the adjusted braking pressure at the first wheel brake is less than the braking pressure applied by an operator of the vehicle, and the adjusted braking pressure at the second wheel brake is less than the braking pressure applied by the operator of the vehicle.

9. The hill-hold control system of claim 1, further comprising a third wheel brake, wherein the controller adjusts a braking pressure at the third wheel brake.

10. The hill-hold control system of claim 9, wherein the third wheel brake is for a trailer wheel.

11. The hill-hold control system of claim 9, wherein the adjusted pressure at the third wheel brake is greater than the adjusted pressures at the first and second wheel brakes.

12. The hill-hold control system of claim 1, wherein the controller determines the vehicle is at standstill based on a signal from one or more of a group of sensors, the group of sensors including a wheel speed sensor, an accelerometer, and a lateral acceleration sensor.

13. A method of performing hill-hold control for a vehicle, the method comprising:
   determining, by a controller, that the vehicle is at standstill;
   detecting, by the controller, from a braking indicator that braking is no longer desired;
   adjusting, by the controller when braking is no longer desired, a braking pressure at a first wheel brake to a pressure less than a braking pressure applied by an operator of the vehicle;
   adjusting, by the controller when braking is no longer desired, a braking pressure at a second wheel brake to a pressure less than the adjusted braking pressure applied at the first wheel brake;
   detecting, by the controller, from a drive away indicator an operator's desire to drive away; and
   when the operator's desire to drive away is detected, removing, by the controller, the braking pressure at the first wheel brake and the braking pressure at the second wheel brake.

14. The hill-hold control method of claim 13, further comprising determining, by the controller, an amount of brake pressure necessary to hold the vehicle still.

15. The hill-hold control method of claim 14, further comprising adjusting, by the controller, the brake pressure at the first wheel brake and the brake pressure at the second wheel brake based on the brake pressure necessary to hold the vehicle still.

16. The hill-hold control method of claim 15, further comprising adjusting, by the controller, the brake pressure at the first wheel brake to a pressure greater than the brake pressure necessary to hold the vehicle still and the brake pressure at the second wheel brake to a pressure less than the brake pressure necessary to hold the vehicle still.

17. The hill-hold control method of claim 16, wherein the first wheel brake is for a front wheel of the vehicle and the second wheel brake is for a rear wheel of the vehicle.

18. The hill-hold control method of claim 13, wherein the adjusted braking pressure at the first wheel brake is less than the braking pressure applied by an operator of the vehicle, and the adjusted braking pressure at the second wheel brake is less than the braking pressure applied by the operator of the vehicle.

19. The hill-hold control method of claim 13, further comprising adjusting a braking pressure at a third wheel brake, the third wheel brake being a wheel brake for a trailer wheel.

20. The hill-hold control method of claim 19, wherein the adjusted pressure at the third wheel brake is greater than the adjusted pressures at the first and second wheel brakes.

* * * * *